(12) United States Patent
Gilday et al.

(10) Patent No.: US 8,826,079 B2
(45) Date of Patent: Sep. 2, 2014

(54) DATA PROCESSING APPARATUS AND METHOD FOR IDENTIFYING DEBUG EVENTS

(75) Inventors: David Michael Gilday, Chatteris (GB); Simon John Craske, Cambridge (GB)

(73) Assignee: ARM Limited, Cambridge (GB)

(*) Notice: Subject to any disclaimer, the term of this patent is extended or adjusted under 35 U.S.C. 154(b) by 178 days.

(21) Appl. No.: 13/327,989

(22) Filed: Dec. 16, 2011

(65) Prior Publication Data

US 2013/0159776 A1 Jun. 20, 2013

(51) Int. Cl.
*G06F 11/00* (2006.01)
*G06F 11/36* (2006.01)

(52) U.S. Cl.
CPC .................................. *G06F 11/3636* (2013.01)
USPC ............................. 714/30; 714/25; 714/47.1

(58) Field of Classification Search
USPC .................................. 714/30, 10, 25, 48, 47.1
See application file for complete search history.

(56) References Cited

U.S. PATENT DOCUMENTS

| | | | |
|---|---|---|---|
| 2003/0056154 A1* | 3/2003 | Edwards et al. | 714/45 |
| 2004/0148548 A1* | 7/2004 | Moyer et al. | 714/25 |
| 2005/0240816 A1* | 10/2005 | Iovin et al. | 714/25 |
| 2010/0281309 A1* | 11/2010 | Laurenti et al. | 714/45 |

OTHER PUBLICATIONS

CoreSight DAP-Lite, *Technical Reference Manual—ARM*, 2008, 90 pages.

* cited by examiner

*Primary Examiner* — Sarai Butler
(74) *Attorney, Agent, or Firm* — Nixon & Vanderhye P.C.

(57) ABSTRACT

A data processing apparatus has at least one circuit block accessible for debugging by a debugger, the block having a set of debug status registers and a debug event register which is set by the circuit block to indicate occurrence of a debug event. Debug interface circuitry interfaces with the set of debug status registers for each circuit block. The circuitry includes at least a first portion which is in a first power domain that remains in a fully powered state while the debugger is connected to the circuitry. Status registers are provided in a second power domain which transitions between the fully powered state and at least one low power state while the debugger is connected to the circuitry. Content of the debug status registers is only accessible to the debugger when the second power domain is in the fully powered state.

15 Claims, 4 Drawing Sheets

DATA PROCESSING APPARATUS AND METHOD FOR IDENTIFYING DEBUG EVENTS

FIELD OF THE INVENTION

1. Field of the Invention

The present invention relates to a data processing apparatus and method for identifying debug events to a debugger connected to the data processing apparatus.

2. Description of the Prior Art

It is known to provide a data processing apparatus with debug interface circuitry via which a debugger can be connected to the data processing apparatus to enable the debugger to perform debugging operations. The data processing apparatus will typically include one or more circuit blocks that are accessible to the debugger via the debug interface circuitry to enable debugging operations to be performed on those circuit blocks. Examples of such circuit blocks are a processor core, trace circuitry used to trace the activities of the processor core, or other functional components within the data processing apparatus.

Each circuit block will typically have a set of debug status registers associated with it, those debug status registers being accessible to the debugger via the debug interface circuitry in order to perform the required debug operations. For example, the debugger may read status information from those registers, and/or may write data into those registers to cause certain debugging operations to be performed within the associated circuit block. One of the debug status registers is typically a debug event register which can be set by the circuit block to indicate occurrence of a debug event within the circuit block. In accordance with known techniques, such a debug event register is typically periodically polled by the debugger such that, once the debug event register has been set by the associated circuit block, that will subsequently be detected by the debugger as a result of the polling activities, whereafter the debugger will perform an appropriate debugging activity in response to that debug event. The debug event registers can take a variety of forms, but as a particular example the debug event register may be set to identify that an associated processor core has halted execution.

There is a general desire for the activities of a debugger to be as non-invasive as possible to the data processing apparatus, so that the data processing apparatus runs as naturally as possible during the debugging operation. Traditionally, the techniques developed to allow debuggers to be as non-invasive as possible have concentrated on seeking to reduce any effect on the performance of the data processing apparatus that arises as a result of the activities of the debugger. However, in modern data processing systems, more and more complex mechanisms are provided to control power consumption, and often multiple different power domains are provided within the data processing apparatus to allow parts of the data processing apparatus to selectively be placed in one or more low power states in order to seek to reduce power consumption. When performing debugging of such a data processing apparatus, it is also desirable for the debugger to be non-invasive in terms of not affecting the power profile of the data processing apparatus. Hence, if a portion of the data processing apparatus including a circuit block that is being debugged would transition between a fully powered state and one or more low power states during normal operation, it would also be desirable to allow that portion of the data processing apparatus to make those transitions in power state whilst debugging is being performed, in order to ensure reliable debugging having regards to the actual way in which the apparatus will be used in normal operation.

However, this can cause issues with regards to the polling of the debug event registers as outlined above. Typically, if a circuit block sets its associated debug event register to indicate the presence of a debug event within that circuit block, that circuit block will be in the fully powered state at the time, and will remain in the fully powered state, since it is awaiting a debug action. In that scenario, the debug event register can be readily accessed by the debugger during the above mentioned polling activity, and the presence of the set debug event register can hence readily be detected.

However, a problem arises when the circuit block has not set the debug event register, and instead enters a low power state, this typically causing the associated debug status registers to also enter a low power state. In such a scenario, when the debugger decides that the debug event register needs to be polled, this will require at least the relevant debug status registers, and typically the associated circuit block, to be exited from the low power state, to enable the debug event register to be polled. Once the polling has finished, the relevant debug status registers and associated circuit block can then re-enter the low power state. Typically when such a sequence of events takes place, it will be determined that the debug event register is not set, and accordingly the cycling of the relevant components back into the full power state to allow the polling to take place, followed by returning them to the low power state, will have served no purpose. In addition, that activity by its nature will have affected the power profile of the data processing apparatus and hence have increased the invasiveness of the debugging activities.

Accordingly, it would be desirable to provide an improved mechanism for allowing the debugger to perform its usual polling activities, but in a less invasive manner.

SUMMARY OF THE INVENTION

Viewed from a first aspect, the present invention provides a data processing apparatus comprising: at least one circuit block that is accessible for debugging by a debugger coupled to the data processing apparatus, each of said at least one circuit block having a set of debug status registers associated therewith, said set of debug status registers including a debug event register which is set by the circuit block to indicate occurrence of a debug event within the circuit block; debug interface circuitry via which said debugger connects to said data processing apparatus, and configured to interface said debugger with said set of debug status registers for each of said at least one circuit block; the debug interface circuitry including at least a first portion which is in a first power domain that remains in a fully powered state whilst said debugger is connected to said debug interface circuitry; said set of debug status registers associated with each of said at least one circuit block being in a second power domain which is allowed to transition between said fully powered state and at least one low power state whilst said debugger is connected to said debug interface circuitry, content of said debug status registers only being accessible to the debugger via the debug interface circuitry when said second power domain is in said fully powered state; and at least one debug attention register provided within said first power domain in association with said first portion of the debug interface circuitry, said at least one debug attention register configured to provide information identifying whether the debug event register provided within the set of debug status registers for any of said at least one circuit block is set; whereby polling performed by the debugger to detect debug events is performed in respect of said at least one debug attention register, and only if a result of such polling indicates that the debug event register provided within the set of debug status registers for any of said at least one circuit block is set is polling of the debug status registers then performed by the debugger to identify the debug event.

In accordance with the present invention, at least one debug attention register is provided within the first power domain in association with the first portion of the debug interface circuitry, and hence is always in the fully powered state whilst the debugger is connected to the debug interface circuitry. This at least one debug attention register is configured to provide information identifying whether any debug event register has been set. The polling activity performed by the debugger to detect debug events involves initially polling the at least one debug attention register. Only if a result of such polling indicates that one of the debug event registers has been set does polling of the actual debug event registers within the debug status registers then take place in order to identify the debug event.

Such an approach avoids any unnecessary transitions of components within the data processing apparatus from a low power state to a fully powered state, and then back to the low power state, merely for the purpose of supporting the polling activities of the debugger, and hence significantly reduces the invasiveness of the debugging activities when viewed from a power profile viewpoint. This reduction in the invasiveness of the debugging activities is achieved without any loss of functionality, since the same frequency of polling can be performed by the debugger but with that polling activity being targeted predominantly at the debug attention register(s), with the actual debug event registers only being polled when the polling of the debug attention register(s) indicates that that is appropriate.

The at least one debug attention register can take a variety of forms. In one embodiment a single debug attention register is provided which is configured to be set if the debug event register provided within the set of debug status registers for any of said at least one circuit block is set. In one particular embodiment, each debug event register is a single bit register.

Whilst the data processing apparatus may have only a single circuit block which is the target of debugging activities of the debugger, in one embodiment a plurality of circuit blocks are debugged, and accordingly there are a plurality of sets of debug status registers accessible to the debugger, each set including a debug event register. In one such embodiment, the debug attention register may provide a single field which is set based on the logical combination of the states of all of the various debug event registers, such that if that field is set it indicates that at least one of the debug event registers is set. In one particular embodiment, the single field may be a single bit field.

However, in an alternative embodiment said at least one debug attention register provides a plurality of fields, each field being associated with the debug event register provided within the set of debug status registers associated with one of said circuit blocks, and each field being set if the associated debug event register is set. Hence, in such embodiments, polling of the least one debug attention register enables the debugger to determine which debug status registers should be the subject of a subsequent polling activity in the event that one or more fields are set.

In one embodiment, a single debug attention register can be provided comprising the plurality of fields. Alternatively, a plurality of debug attention registers can be provided, each register providing at least one of the fields. In one particular embodiment, each debug event register is a single bit register, and each field of the at least one debug attention register is a single bit field.

In one particular embodiment said at least one debug attention register further comprises a master field which is set if the debug event register provided within the set of debug status registers for any of said at least one circuit block is set. The polling performed by the debugger in respect of said at least one debug attention register is initially performed in respect of said master field, and only if said master field is set is polling performed in respect of said plurality of fields of said at least one debug attention register. This provides a particularly power efficient polling mechanism, since initially only the master field is polled, and only if the master field is set are all the other fields of the at least one debug attention register polled.

In one embodiment, occurrence of a debug event within said at least one circuit block will only occur whilst said second power domain is in said fully powered state, and the data processing apparatus further comprises clamping circuitry configured to be responsive to said second power domain being placed into said at least one low power state, to cause said at least one debug attention register to have its input clamped to a state indicating that no debug event register is set. Such an approach ensures that when the second power domain is placed into a low power state the information in the at least one debug attention register is held to a value that will identify that no debug event register is set, and hence will not cause the second power domain to be exited from that low power state due to debug event polling activity of the debugger.

The at least one low power state in which the second power domain may be placed can take a variety of forms. It may for example be a state retention state where power is maintained to at least some of the components in order to ensure that data within those components is not lost. Alternatively, the low power state may be a power off state.

Whilst the low power states can be achieved by reducing, or removing, the voltage supplies to the relevant components, there are other ways in which at least some low power states can be achieved. For example, in one embodiment, at least one low power state may be achieved by clock gating certain components within the second power domain so that they do not operate, and hence do not consume power. Alternatively, the clock frequency of the clock signal controlling various components within the second power domain may be reduced causing those components to operate more slowly, and hence consume less power.

Viewed from a second aspect the present invention provides a system comprising: a data processing apparatus; and a debugger connected to said data processing apparatus to perform debugging operations; the data processing apparatus comprising: at least one circuit block that is accessible for debugging by the debugger, each of said at least one circuit block having a set of debug status registers associated therewith, said set of debug status registers including a debug event register which is set by the circuit block to indicate occurrence of a debug event within the circuit block; debug interface circuitry via which said debugger is connected to said data processing apparatus, and configured to interface said debugger with said set of debug status registers for each of said at least one circuit block; the debug interface circuitry including at least a first portion which is in a first power domain that remains in a fully powered state whilst said debugger is connected to said debug interface circuitry; said set of debug status registers associated with each of said at least one circuit block being in a second power domain which is allowed to transition between said fully powered state and at least one low power state whilst said debugger is connected to said debug interface circuitry, content of said debug status registers only being accessible to the debugger via the debug interface circuitry when said second power domain is in said fully powered state; and at least one debug attention register provided within said first power domain in association with said first portion of the debug interface circuitry, said at least one debug attention register configured to provide information identifying whether the debug event register provided within the set of debug status registers for any of said at least one circuit block is set; the debugger being configured to perform a polling routine to detect said debug events, said polling routine comprising, in a first stage, performing periodic polling of said at least one debug attention register to retrieve data from said at least one debug attention register; the polling routine remaining in said first stage whilst the retrieved data from said at least one debug attention register indicates that no debug event register is set; and when the retrieved data from said at least one debug attention register indicates that the debug event register provided within the set of debug status registers for any of said at least one circuit block is set, the polling routine moves to a second stage during which polling of the debug status registers is performed by the debugger to identify the debug event.

Viewed from a third aspect, the present invention provides a method of identifying debug events within a data processing apparatus, the data processing apparatus having at least one circuit block that is accessible for debugging by a debugger coupled to the data processing apparatus, each of said at least one circuit block having a set of debug status registers associated therewith, said set of debug status registers including a debug event register which is set by the circuit block to indicate occurrence of a debug event within the circuit block, the method comprising: connecting said debugger to debug interface circuitry of said data processing apparatus, and configuring the debug interface circuitry to interface said debugger with said set of debug status registers for each of said at least one circuit block; arranging at least a first portion of the debug interface circuitry to be in a first power domain that remains in a fully powered state whilst said debugger is connected to said debug interface circuitry; arranging said set of debug status registers associated with each of said at least one circuit block to be in a second power domain that is allowed to transition between said fully powered state and at least one low power state whilst said debugger is connected to said debug interface circuitry, content of said debug status registers only being accessible to the debugger via the debug interface circuitry when said second power domain is in said fully powered state; providing at least one debug attention register within said first power domain in association with said first portion of the debug interface circuitry, and configuring said at least one debug attention register to provide information identifying whether the debug event register provided within the set of debug status registers for any of said at least one circuit block is set; performing a polling routine in the debugger to detect said debug events, said polling routine comprising, in a first stage, performing periodic polling of said at least one debug attention register to retrieve data from said at least one debug attention register; retaining the polling routine in said first stage whilst the retrieved data from said at least one debug attention register indicates that no debug event register is set; and when the retrieved data from said at least one debug attention register indicates that the debug event register provided within the set of debug status registers for any of said at least one circuit block is set, transitioning the polling routine to a second stage during which polling of the debug status registers is performed by the debugger to identify the debug event.

Viewed from a fourth aspect, the present invention provides a data processing apparatus comprising: at least one circuit block means for access by debugger means coupled to the data processing apparatus, each of said at least one circuit block means having a set of debug status register means associated therewith, said set of debug status register means including a debug event register means for setting by the circuit block means to indicate occurrence of a debug event within the circuit block means; debug interface means for connecting said debugger means to said data processing apparatus, and for interfacing said debugger means with said set of debug status register means for each of said at least one circuit block means; the debug interface means including at least a first portion which is in a first power domain that remains in a fully powered state whilst said debugger means is connected to said debug interface means; said set of debug status register means associated with each of said at least one circuit block means being in a second power domain which is allowed to transition between said fully powered state and at least one low power state whilst said debugger means is connected to said debug interface means, content of said debug status register means only being accessible to the debugger means via the debug interface means when said second power domain is in said fully powered state; and at least one debug attention register means provided within said first power domain in association with said first portion of the debug interface means, said at least one debug attention register means for providing information identifying whether the debug event register means provided within the set of debug status register means for any of said at least one circuit block means is set; whereby polling performed by the debugger means to detect debug events is performed in respect of said at least one debug attention register means, and only if a result of such polling indicates that the debug event register means provided within the set of debug status register means for any of said at least one circuit block means is set is polling of the debug status register means then performed by the debugger means to identify the debug event.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
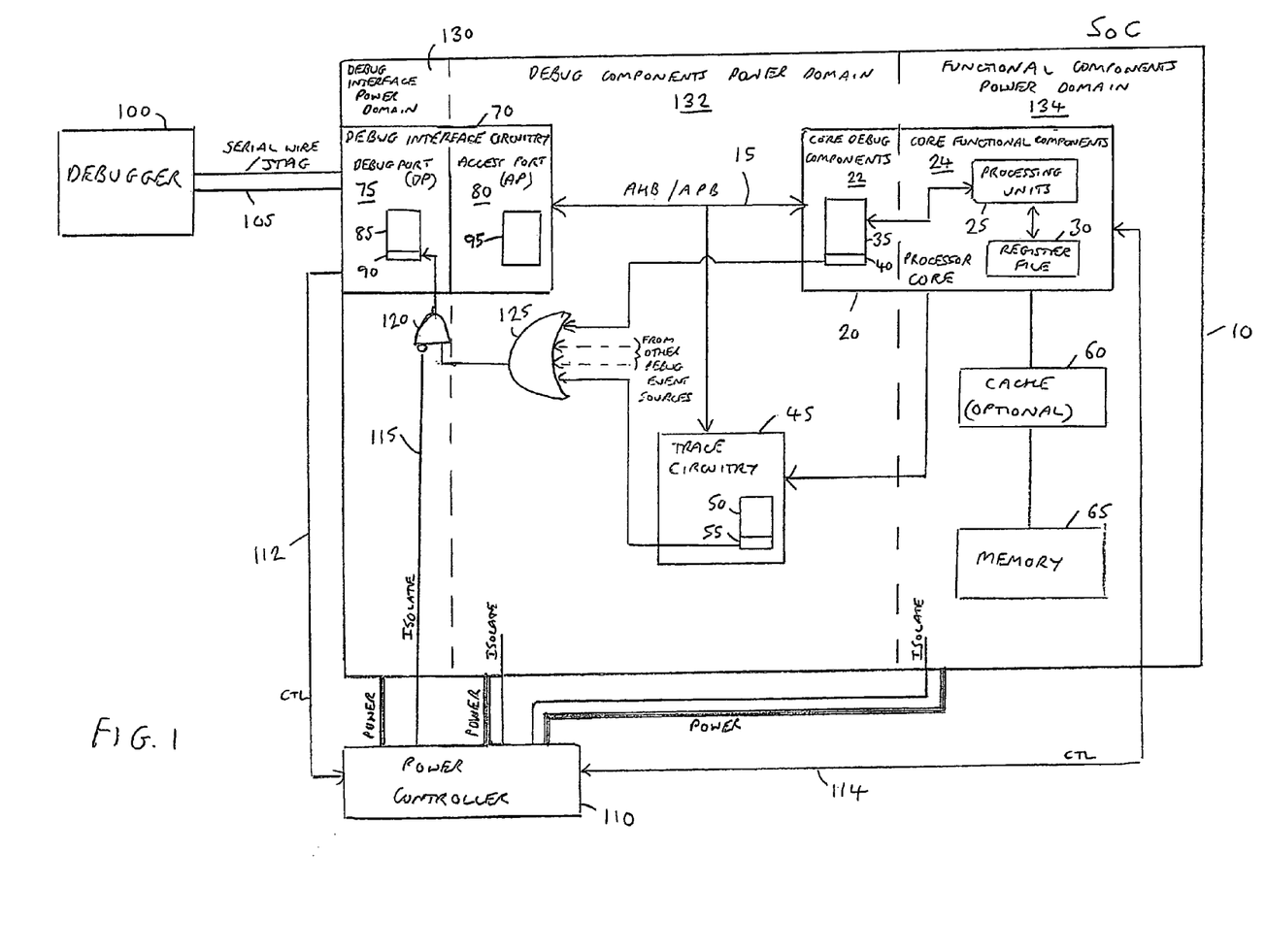
FIG. 1 is a block diagram illustrating a data processing apparatus in accordance with one embodiment.

FIG. 1 is block diagram of a data processing apparatus in accordance with a first embodiment. In this embodiment, the data processing apparatus takes the form of a system-on-chip (SoC) 10 providing a number of circuit blocks that are accessible for debugging by debugger 100 coupled to the SoC 10 via a debug interface path 105. As will be appreciated by those skilled in the art, the debugger can take a variety of forms, but in one embodiment will consist of a debugging application running on a computer.

In the example illustrated in FIG. 1, two circuits blocks are shown, namely a processor core 20 and trace circuitry 45. The processor core 20 includes core functional components 24 for performing the processing activities of the processor core. Hence, by way of illustration, one or more processing units 25 within the processor core 20 are arranged to perform data processing operations in response to data processing instructions, those processing units having access to a register file 30 containing data used by the processing units when performing those data processing operations. Data can be loaded into the register file 30 from memory 65 via one or more optional cache structures 60, and similarly data in the register file can be stored from the register file back to memory 65 via such optional cache structures 60. It will be understood that various other functional components will typically be provided within the SoC, but for simplicity those other components are omitted in FIG. 1.

In addition to the functional components, the processor core 20 also includes a number of core debug components 22 for enabling debug operations to be performed on the processor core from the debugger 100. These core debug components 22 include a set of debug status registers 35, and one of those debug status registers is a debug event register 40 which can be set by the processor core 20 to indicate occurrence of a debug event within the processor core. In one particular example, the debug event register 40 is set each time the processor core halts execution during debugging, at this point the processor core then awaiting some action by the debugger 100.

The trace circuitry 45 is configured to monitor the activities of the processor core 20 in order to produce a trace stream which can be output off chip for analysis. It also may include a set of debug status registers 50, and again one of those registers may be a debug event register 55 which can be set by the trace circuitry to indicate occurrence of a debug event within the trace circuitry 45.

The SoC 10 includes debug interface circuitry 70 for providing an interface between the debugger 100 and the various circuit blocks 20, 45 that are to be accessed by the debugger during debugging operations. The debug interface circuitry 70 can be considered to be formed of two portions, the first portion being the debug port (DP) 75 which provides an interface to the debugger 100 over the debugger connection path 105. A second portion of the debug interface circuitry 70 is the access port (AP) 80 which provides a mechanism for allowing the debugger to access debug components such as the various debug status registers 35, 50, including the debug event registers 40, 55.

The debug port 75 includes a number of debug registers 85 which can be accessed by the debugger 100 to control various aspects of the debugging process. In accordance with embodiments, these debug registers include at least one new register, referred to herein as a debug attention register 90, whose use will be discussed further herein. The access port 80 also includes a number of access control registers 95 which can be accessed by the debugger as and when required during debugging. The access control registers 95 provide, amongst other things, a mechanism for allowing the debugger to access the debug status registers 35, 50 including the debug event registers 40, 55.

Examples of debug interface circuitry 70 which includes all of the features illustrated in respect of block 70 in FIG. 1, other than the new debug attention register 90, are found in the Debug Access Port (DAP) products developed by ARM Limited, Cambridge, United Kingdom. ARM's DAP products incorporate the debug registers 85 and the access control registers 95, and in accordance with the described embodiment of FIG. 1 those registers are used in the standard way to allow the debugger to control the debugging operations within the SoC 10, and to allow the debugger to access the various debug status registers 35, 50. One of the functions achieved by the debug interface circuitry 70 is to provide for protocol conversion between the communication used over the debug path 105 and the internal communications occurring over the bus 15 within the SoC. Considering the example of ARM's DAP products, the signals routed over path 105 may use either a serial wire communication protocol or a JTAG communication protocol, whilst the bus 15 may be a system bus employing, for example, the AHB bus protocol developed by ARM Limited, Cambridge, United Kingdom, or alternatively the APB bus protocol also developed by ARM Limited, Cambridge, United Kingdom. For more details of the general operation of ARM's DAP products, the reader is referred to the "CoreSight™ DAP-Lite Technical Reference Manual, a copy of which can be found on the Internet at http://infocenter.arm.com/help/topic/com.arm.doc.ddi0316d/DDI0316D_dap_lite_trm.pdf. However, as that general operation is not germane to the functionality of the at least one debug attention register 90 provided in an accordance with embodiments of the present invention, it will not be discussed further herein.

As shown in FIG. 1, the SoC 10 includes a number of different power domains 130, 132, 134 and those power domains are controlled by the power controller 110. Whilst the power controller 110 has been shown externally to the SoC, it will be understood by those skilled in the art that at least some of the functionality of the power controller may be incorporated internally within the SoC, whilst other components such as voltage regulators may be provided externally. As shown, the power controller 110 provides power control signals to the various power domains, and also typically provides various isolation signals used to clamp signals passing into one power domain from another. One particular isolation signal issued by the power controller 110 is the isolation signal over path 115, which is inverted to provide an input to the AND gate 120 used to control input to the debug attention register 90, for reasons that will be discussed further below.

The debug interface power domain 130 is arranged to always be fully powered, at least whilst the debugger 100 is connected to the debug port 75 of the debug interface circuitry 70. However, to enable the SoC 10 to mimic as closely as possible its normal behaviour whilst debugging is being performed, this constraint is not placed on either the debug components power domain 132 or the functional components power domain 134, and both of these power domains may transition from a fully powered state to one or more low power states, and back again to the fully powered state, as often as desired during the performance of debugging by the debugger 100.

Accordingly, the processor core 24 may decide to enter a low power state, and may issue a control signal over path 114 to the power controller 110 indicating this. In response to that control signal, the power controller will then reduce the power to the power domain 134 accordingly, and send any appropriate isolation signals to that power domain. Typically this will also cause the power controller 110 to place the debug components power domain 132 into a low power state and to issue appropriate isolation signals to that power domain.

As shown in FIG. 1, each of the debug event registers 40, 55 outputs its current state to inputs of circuitry 125 that is arranged to perform a logical OR operation on those inputs. The output from the circuitry 125 then provides a second input to the AND gate 120. In the absence of the isolation signal over path 115 being set (in this example a set state being a logic 1 state), it will be appreciated that this will cause that output to be propagated on to the debug attention register 90. As a result, it will be seen that whenever one of the debug event registers 40, 55 is set, this will cause the debug attention register 90 to also be set, thereby indicating that at least one debug event has occurred within the SoC 10.

Debug events will only be set in the debug event registers 40, 55 whilst those registers are fully powered, and hence whilst the debug components power domain 132 is in the fully powered state. Typically the functional components power domain 134 will also be in the fully powered state at that time. For example, if the processor core 20 sets the debug event register 40 to indicate the presence of a debug event within the processor core 20, it will then be expecting a debug action to be taken by the debugger, and accordingly will stay in the fully powered state. Conversely, the debug event registers 40, 55 will not be set whilst the debug components power domain 132 is in a low power state. Accordingly, if the debug components power domain 132 is not in the fully powered state, it is appropriate for the debug attention register 90 to be cleared rather than set, and this can be ensured by the operation of the AND gate 120 in combination with the isolation signal over path 115, the AND gate providing a clamping function. In particular, when the power domain 132 is not in the fully powered state, the isolation signal on path 115 will be set, causing a logic 0 value to be provided at the input of the debug attention register 90 irrespective of the output of the OR gate circuitry 125.

In the above described embodiment, it is assumed that the debug attention register 90 is a logical register, hence providing an address that can be polled by the debugger 100. Hence, the clamping function described with reference to the AND gate 120 is useful to ensure that the correct value is always presented when that logical register 90 is polled. However, in alternative embodiments, such as where the debug attention register 90 is provided by a physical register arranged to latch its input on occurrence of a clock signal, such clamping functionality may not be required.

The approach of using a debug attention register 90 such as described in FIG. 1 has significant benefits when considering the invasiveness of the debugging activities, since this enables a significant reduction in that invasiveness when considering the polling activities required by the debugger in order to detect and action debug events, as will be discussed in more detail below with reference to the flow diagram of FIG. 2.

Figure 2:
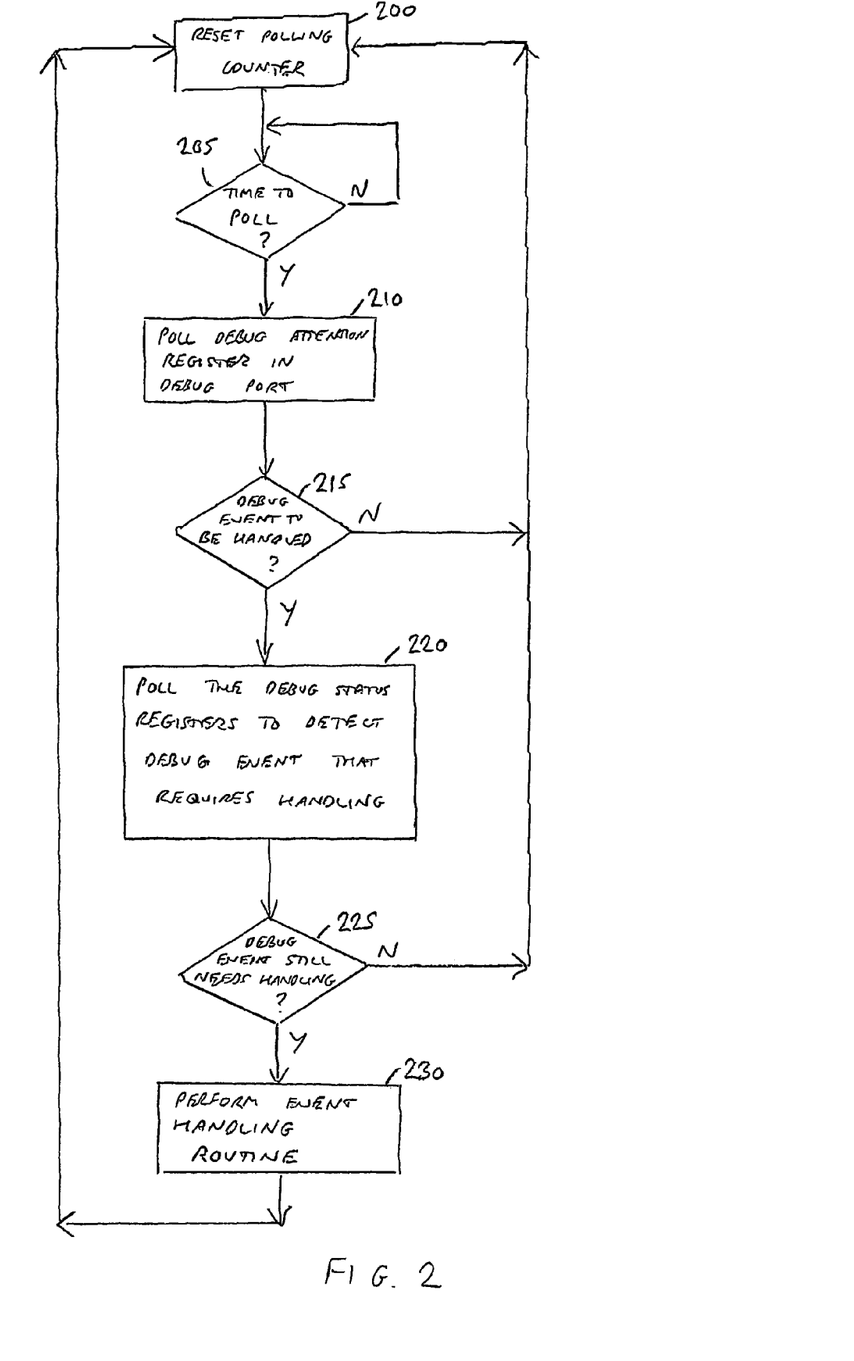
FIG. 2 is a flow diagram illustrating the polling activity performed by the debugger of FIG. 1 in accordance with one embodiment.

As shown in FIG. 2, at step 200, the debugger 100 resets a polling counter, and then at step 205 determines with reference to that counter whether it is time to perform a polling operation. When it is time to perform a polling operation, the process proceeds to step 210 where the debug attention register 90 within the debug port 75 is polled by the debugger 100.

Based on the result of that polling operation, it is determined at step 215 whether there is a debug event to be handled i.e, whether the debug attention register is set. If not, the process returns to step 200 where the polling counter is reset and then the process is repeated.

However, if at step 215 it is determined that there is a debug event to be handled, then at step 220 the debug status registers 35, 50 are polled in order to detect the debug event that requires handling. As mentioned earlier, the debugger 100 polls these registers via the access port 80 and in particular by setting certain of the access control registers 95 so as to cause a polling operation to be issued over the bus 15 to those debug status registers 35, 50. In particular, the debug event registers 40, 55 will be polled in order to determine which, if either of them, is set. In principle, one of them should be set given that the debug attention register 90 was set, but in practice it is possible that in the intervening period between it being assessed that the debug attention register was set, and the debug event registers 40, 55 being polled, the reason for one of the debug event registers being set has been removed, and accordingly its state has been changed to a clear state.

As mentioned earlier, it is possible at the time it is decided to poll the debug status registers at step 220 that the power domain 132, and also the power domain 134, may be in a low power state. If this is the case, then on receipt of the polling request from the debugger the debug port 75 will issue a control signal over path 112 to the power controller 110, to cause the power controller to bring those power domains back into the fully powered state. Often, this will involve not only restoring the power levels to the relevant components, but may also involve one or more further actions, for example the power controller 110 may issue a control signal over path 114 to the processor core to bring it out of any sleep state that it may have been in whilst the power domain 134 is in a lower state. Once the power domain 132 is back in the fully powered state, it is possible for the access port 80 to then perform the required polling over the bus 15 in order to retrieve the current contents of the debug event registers 40, 55, whereafter that data is returned to the debugger 100. The power domains 132, 134 can then be returned to their low power states if desired.

Once the debugger has received the results of the polling operation performed at step 220, it is determined whether there is a debug event still to be handled. As mentioned earlier, there will be, unless the debug event register that had been set has been cleared in the intervening period. If there is no debug event still to be handled, then the process merely returns to step 200 where the polling counter is reset. However, assuming that there is an event still to be handled, then at step 230 the appropriate event handling routine is performed by the debugger 100 in the usual manner. As the process performed by the debugger at this point is entirely conventional, it will not be discussed further herein. Following the performance of the event handling routine, the process returns to step 200 where the polling counter is reset.

Figure 3:
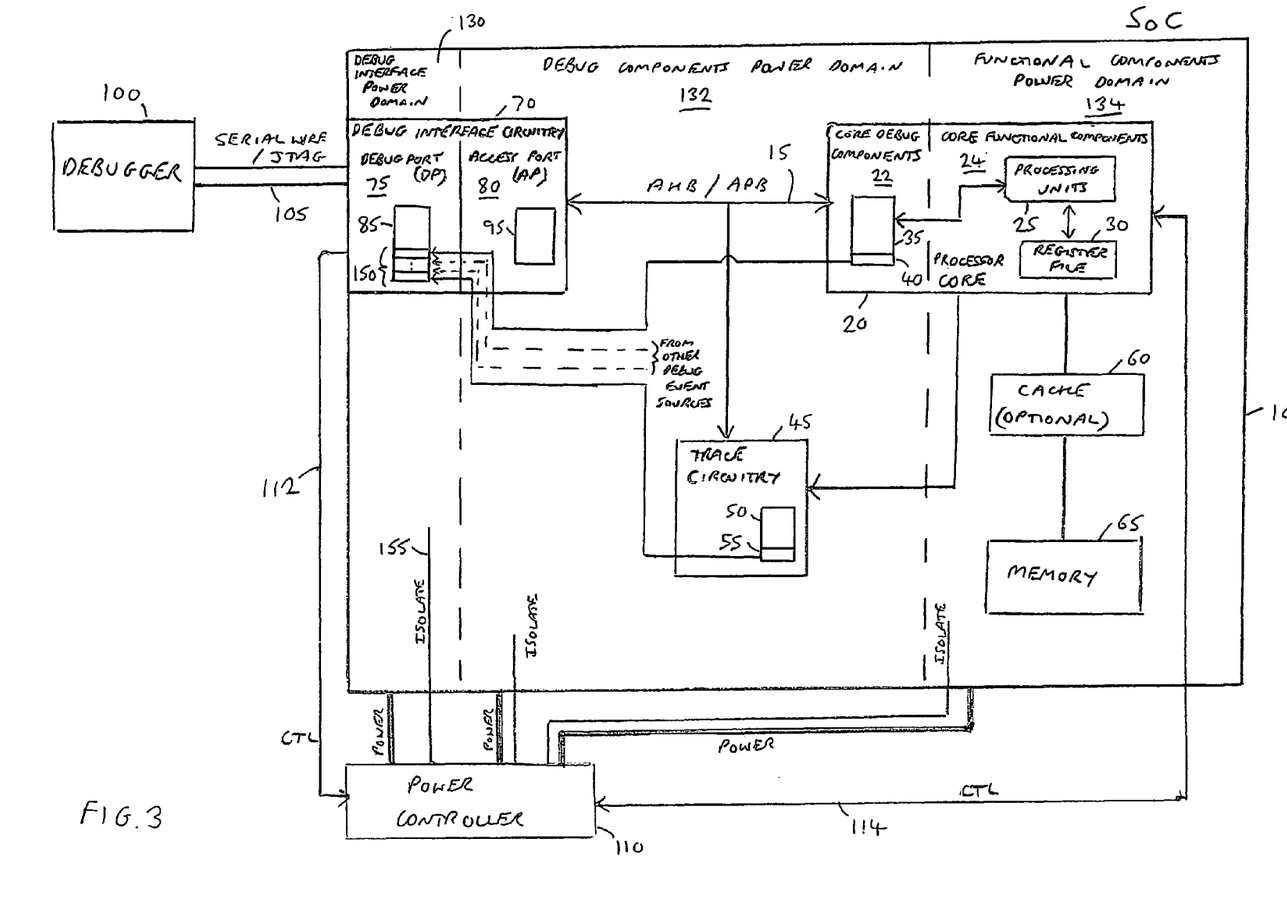
FIG. 3 is a block diagram illustrating a data processing apparatus in accordance with an alternative embodiment.

FIG. 3 illustrates an alternative embodiment where instead of a single bit debug attention register 90 being provided, a multi-bit debug attention register structure 150 as provided. This structure may be formed by a single multi-bit debug attention register providing a plurality of fields, each field being associated with one of the debug event registers 40, 55. Alternatively, multiple separate debug attention registers may be provided to form the structure 150.

As will be seen from a comparison of FIG. 3 with FIG. 1, the operation of the circuitry is essentially the same as discussed with reference to FIG. 1. However, there is no OR gate circuitry 125 and instead the signals from the various debug event registers are fed directly into the relevant fields of the debug attention register structure 150. Similar clamping structures to the AND gate 120 of FIG. 1 can be provided in the circuitry of FIG. 3 if required, for example by providing one AND gate structure per signal path feeding into the debug attention register structure 150, and with each such AND gate receiving as one of its inputs an inverted version of the isolate signal over path 155. However, for simplicity in the figure, these structures have not been illustrated.

Figure 4:
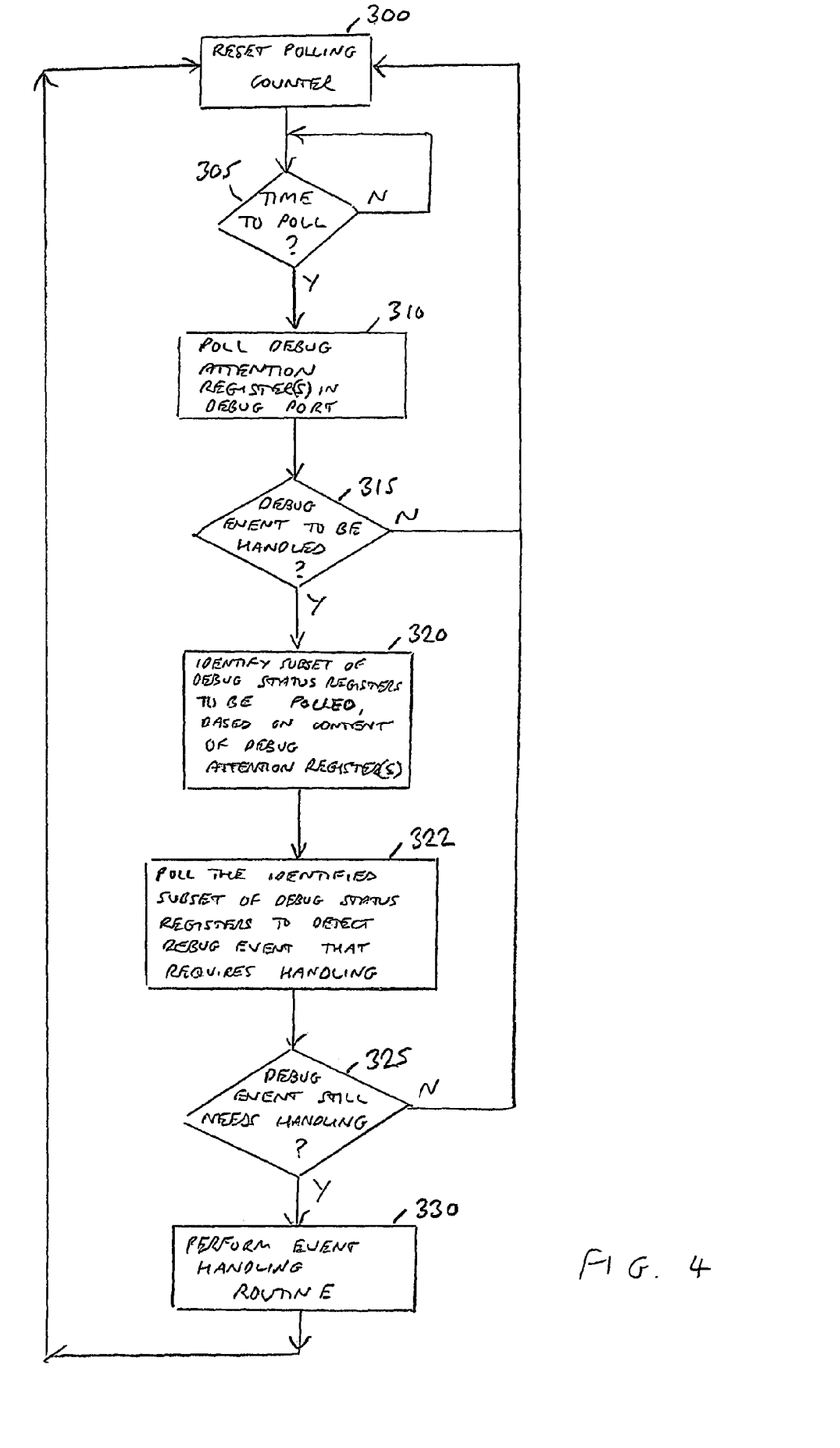
FIG. 4 is a flow diagram illustrating the polling activity performed by the debugger of FIG. 3 in accordance with one embodiment.

FIG. 4 is a flow diagram illustrating the polling operations performed by the debugger in accordance with the embodiment of FIG. 3. Steps 300 and 305 are identical to steps 200 and 205 of FIG. 2. However, at step 310, the debug attention register structure 150 in the debug port is polled rather than the single bit debug attention register 90 of FIG. 1.

At step 315, it is determined whether there is a debug event to be handled, this being determined to be the case if any of the fields of the debug attention register structure 150 are set. Assuming this is the case, the process proceeds to step 320, where the subset of debug status registers that need to be polled is identified, based on the contents of the debug attention register structure 150. In particular, it will be understood that due to the structure 150, one or more of the debug status registers can be discounted from the subsequent polling process required, if the relevant field in the structure 150 indicates that those debug status registers do not have their debug event register set.

Thereafter, at step 322, the identified subset of debug status registers are polled in order to detect the debug event that requires handling. This is performed in an identical manner to the process described earlier with reference to step 220 of FIG. 2 other than the fact that not all of the debug status registers will necessarily be included in the polling activity. Steps 325 and 330 are then identical to steps 225 and 230 of FIG. 2.

As a further embodiment, the structure 150 in FIG. 3 can be altered to include a further additional field, referred to herein as a master field, the master field having its input provided by a logical OR of the various outputs from the debug event registers, and hence being analogous to the single bit debug attention register 90 of FIG. 1. In one such embodiment, when considering FIG. 4, at step 310 only the master field needs to be polled, and then at step 315 it can be determined if there is a debug event to be handled by determining whether the master field is set or not. If a debug event is to be handled, then at step 320 the other fields of the debug attention register structure 150 will be polled in order to provide the information required to identify the subset of debug status registers to be polled, whereafter the process will continue as discussed earlier with reference to FIG. 4.

From the above description of embodiments, it will be seen that such embodiments enable a reduction in the invasiveness of the debugging activity when considered from a power consumption viewpoint, and in particular allow the power profile of the data processing apparatus to more closely follow the power profile that would be observed during normal operation (i.e. when debugging is not being performed), thereby providing a more effective debugging environment. This benefit can be achieved without changing the polling frequency of the polling activities performed by the debugger in order to detect occurrence of debug events.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
    at least one circuit block that is accessible for debugging by a debugger coupled to the data processing apparatus, each of said at least one circuit block having a set of debug status registers associated therewith, said set of debug status registers including a debug event register which is set by the circuit block to indicate occurrence of a debug event within the circuit block;
    debug interface circuitry via which said debugger connects to said data processing apparatus, and configured to interface said debugger with said set of debug status registers for each of said at least one circuit block;
    the debug interface circuitry including at least a first portion which is in a first power domain that remains in a fully powered state whilst said debugger is connected to said debug interface circuitry;
    said set of debug status registers associated with each of said at least one circuit block being in a second power domain which is allowed to transition between said fully powered state and at least one low power state whilst said debugger is connected to said debug interface circuitry, content of said debug status registers only being accessible to the debugger via the debug interface circuitry when said second power domain is in said fully powered state; and
    at least one debug attention register provided within said first power domain in association with said first portion of the debug interface circuitry, said at least one debug attention register configured to provide information identifying whether the debug event register provided within the set of debug status registers for any of said at least one circuit block is set;
    whereby polling performed by the debugger to detect debug events is performed in respect of said at least one debug attention register, and only if a result of such polling indicates that the debug event register provided within the set of debug status registers for any of said at least one circuit block is set is polling of the debug status registers then performed by the debugger to identify the debug event.

2. A data processing apparatus as claimed in claim 1, wherein said at least one debug attention register is a single register configured to be set if the debug event register provided within the set of debug status registers for any of said at least one circuit block is set.

3. A data processing apparatus as claimed in claim 2, wherein each debug event register is a single bit register and said single debug attention register is a single bit register.

4. A data processing apparatus as claimed in claim 1, wherein:
    said at least one circuit block comprises a plurality of circuit blocks;
    said at least one debug attention register provides a plurality of fields, each field being associated with the debug event register provided within the set of debug status registers associated with one of said circuit blocks, and each field being set if the associated debug event register is set.

5. A data processing apparatus as claimed in claim 4, wherein said at least one debug attention register comprises a single register comprising said plurality of fields.

6. A data processing apparatus as claimed in claim 4, wherein said at least one debug attention register comprises a plurality of registers, each register providing at least one of said fields.

7. A data processing apparatus as claimed in claim 4, wherein each debug event register is a single bit register and each field of said at least one debug attention register is a single bit field.

8. A data processing apparatus as claimed in claim 7, wherein:
    said at least one debug attention register further comprises a master field which is set if the debug event register provided within the set of debug status registers for any of said at least one circuit block is set;

whereby the polling performed by the debugger in respect of said at least one debug attention register is initially performed in respect of said master field, and only if said master field is set is polling performed in respect of said plurality of fields of said at least one debug attention register.

9. A data processing apparatus as claimed in claim 1, wherein:
occurrence of a debug event within said at least one circuit block will only occur whilst said second power domain is in said fully powered state; and
the data processing apparatus further comprises clamping circuitry configured to be responsive to said second power domain being placed into said at least one low power state, to cause said at least one debug attention register to have its input clamped to a state indicating that no debug event register is set.

10. A data processing apparatus as claimed in claim 1, wherein said at least one low power state comprises one of a state retention state and a power off state.

11. A data processing apparatus as claimed in claim 1, wherein said at least one low power state is achieved via at least one of clock gating and reduction of clock frequency of a clock signal supplied to components within said second power domain.

12. A data processing apparatus as claimed in claim 1, wherein said at least one circuit block comprises at least one of a processor core and tracing circuitry configured to trace activity of the processor core.

13. A system comprising:
a data processing apparatus; and
a debugger connected to said data processing apparatus to perform debugging operations;
the data processing apparatus comprising:
  at least one circuit block that is accessible for debugging by the debugger, each of said at least one circuit block having a set of debug status registers associated therewith, said set of debug status registers including a debug event register which is set by the circuit block to indicate occurrence of a debug event within the circuit block;
  debug interface circuitry via which said debugger is connected to said data processing apparatus, and configured to interface said debugger with said set of debug status registers for each of said at least one circuit block;
  the debug interface circuitry including at least a first portion which is in a first power domain that remains in a fully powered state whilst said debugger is connected to said debug interface circuitry;
  said set of debug status registers associated with each of said at least one circuit block being in a second power domain which is allowed to transition between said fully powered state and at least one low power state whilst said debugger is connected to said debug interface circuitry, content of said debug status registers only being accessible to the debugger via the debug interface circuitry when said second power domain is in said fully powered state; and
  at least one debug attention register provided within said first power domain in association with said first portion of the debug interface circuitry, said at least one debug attention register configured to provide information identifying whether the debug event register provided within the set of debug status registers for any of said at least one circuit block is set;
  the debugger being configured to perform a polling routine to detect said debug events, said polling routine comprising, in a first stage, performing periodic polling of said at least one debug attention register to retrieve data from said at least one debug attention register;
  the polling routine remaining in said first stage whilst the retrieved data from said at least one debug attention register indicates that no debug event register is set; and
  when the retrieved data from said at least one debug attention register indicates that the debug event register provided within the set of debug status registers for any of said at least one circuit block is set, the polling routine moves to a second stage during which polling of the debug status registers is performed by the debugger to identify the debug event.

14. A method of identifying debug events within a data processing apparatus, the data processing apparatus having at least one circuit block that is accessible for debugging by a debugger coupled to the data processing apparatus, each of said at least one circuit block having a set of debug status registers associated therewith, said set of debug status registers including a debug event register which is set by the circuit block to indicate occurrence of a debug event within the circuit block, the method comprising:
connecting said debugger to debug interface circuitry of said data processing apparatus, and configuring the debug interface circuitry to interface said debugger with said set of debug status registers for each of said at least one circuit block;
arranging at least a first portion of the debug interface circuitry to be in a first power domain that remains in a fully powered state whilst said debugger is connected to said debug interface circuitry;
arranging said set of debug status registers associated with each of said at least one circuit block to be in a second power domain that is allowed to transition between said fully powered state and at least one low power state whilst said debugger is connected to said debug interface circuitry, content of said debug status registers only being accessible to the debugger via the debug interface circuitry when said second power domain is in said fully powered state;
providing at least one debug attention register within said first power domain in association with said first portion of the debug interface circuitry, and configuring said at least one debug attention register to provide information identifying whether the debug event register provided within the set of debug status registers for any of said at least one circuit block is set;
performing a polling routine in the debugger to detect said debug events, said polling routine comprising, in a first stage, performing periodic polling of said at least one debug attention register to retrieve data from said at least one debug attention register;
retaining the polling routine in said first stage whilst the retrieved data from said at least one debug attention register indicates that no debug event register is set; and
when the retrieved data from said at least one debug attention register indicates that the debug event register provided within the set of debug status registers for any of said at least one circuit block is set, transitioning the polling routine to a second stage during which polling of the debug status registers is performed by the debugger to identify the debug event.

15. A data processing apparatus comprising:
at least one circuit block means for access by debugger means coupled to the data processing apparatus, each of said at least one circuit block means having a set of debug status register means associated therewith, said set of debug status register means including a debug event register means for setting by the circuit block means to indicate occurrence of a debug event within the circuit block means;

debug interface means for connecting said debugger means to said data processing apparatus, and for interfacing said debugger means with said set of debug status register means for each of said at least one circuit block means;

the debug interface means including at least a first portion which is in a first power domain that remains in a fully powered state whilst said debugger means is connected to said debug interface means;

said set of debug status register means associated with each of said at least one circuit block means being in a second power domain which is allowed to transition between said fully powered state and at least one low power state whilst said debugger means is connected to said debug interface means, content of said debug status register means only being accessible to the debugger means via the debug interface means when said second power domain is in said fully powered state; and at least one debug attention register means provided within said first power domain in association with said first portion of the debug interface means, said at least one debug attention register means for providing information identifying whether the debug event register means provided within the set of debug status register means for any of said at least one circuit block means is set;

whereby polling performed by the debugger means to detect debug events is performed in respect of said at least one debug attention register means, and only if a result of such polling indicates that the debug event register means provided within the set of debug status register means for any of said at least one circuit block means is set is polling of the debug status register means then performed by the debugger means to identify the debug event.

* * * * *